United States Patent [19]
Venkateswar et al.

[11] Patent Number: 5,841,956
[45] Date of Patent: Nov. 24, 1998

[54] ANTI-ALIASING FOR DIGITAL PRINTING WITH DOT SHAPE MODULATION AND GREYSCALE

[75] Inventors: Vadlamannati Venkateswar, Plano; Gerhard P. Deffner, Dallas, both of Tex.

[73] Assignee: Texas Instruments Incorporated, Dallas, Tex.

[21] Appl. No.: 778,460

[22] Filed: Jan. 3, 1997

Related U.S. Application Data

[60] Provisional application No. 60/009,614, Jan. 5, 1996.
[51] Int. Cl.$^6$ .......................... H04N 1/23; H04N 1/405; G06K 15/02
[52] U.S. Cl. ..................... 395/109; 358/459; 358/298; 347/240; 347/131; 347/254
[58] Field of Search .................... 395/109; 358/298, 358/459, 455; 347/131, 254, 240, 251; 399/181, 137

[56] References Cited

U.S. PATENT DOCUMENTS 5,461,410 10/1995 Venkateswar et al. .................. 358/298
5,461,411 10/1995 Florence et al. ........................ 347/240

OTHER PUBLICATIONS

James D. Foley, et al., "Antialiasing", *Computer Graphics Priniples and Practice*, 2nd ed. (1990) pp. 132–140.

*Primary Examiner*—Scott Rogers
*Attorney, Agent, or Firm*—Julie L. Reed; Richard L. Donaldson

[57] ABSTRACT

A method of reducing the effects of aliasing. Pixels are divided into phases, such that a phase or combination of phases may be printed to provide one of a number of dot shapes for each pixel. When a pixel is partly overlapped by an object to be printed, that pixel's dot shape is determined by determining which dot shape is the best geometrical match with the overlap. (FIGS. 3 and 7). Then, a greyscale value is determined for the selected dot shape by determining what greyscale will provide an effective greyscale that substantially corresponds to the percent of overlap by the object with the pixel. An alternative method selects a greyscale value for each phase rather than for the entire dot shape.

13 Claims, 3 Drawing Sheets

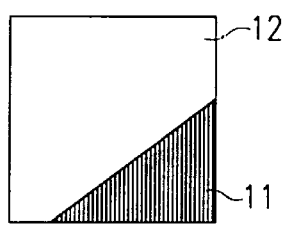 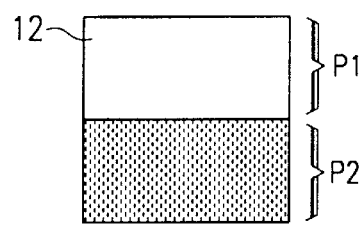 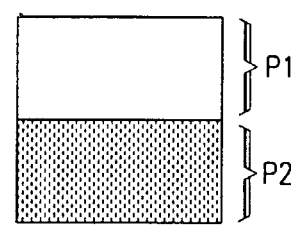
FIG. 2   FIG. 3   FIG. 4
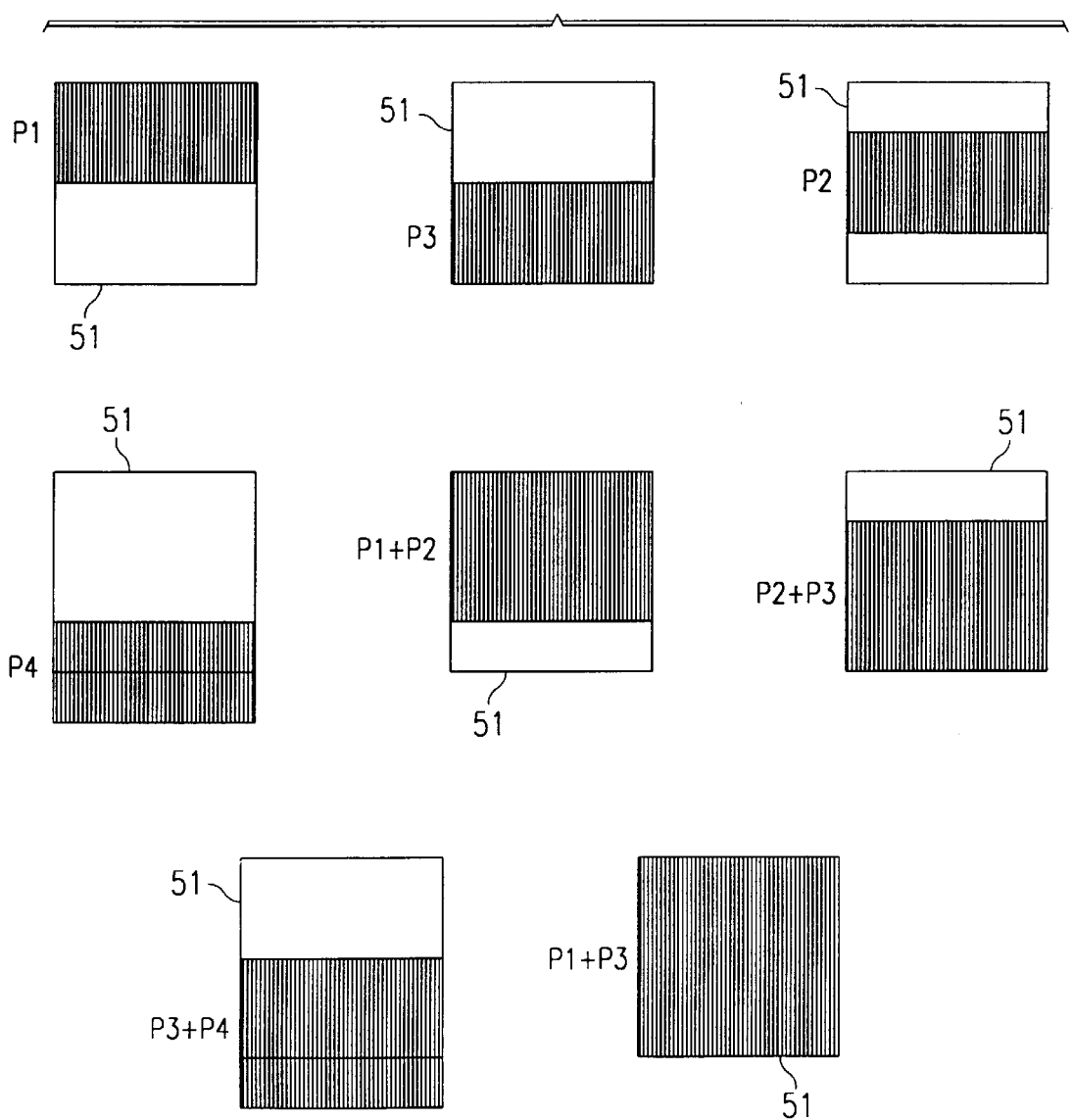
FIG. 5

ANTI-ALIASING FOR DIGITAL PRINTING WITH DOT SHAPE MODULATION AND GREYSCALE

This application claims priority under 35 U.S.C. § 119 (e) (1) of provisional application No. 60/009,614, filed Jan. 5, 1996.

TECHNICAL FIELD OF THE INVENTION

This invention relates generally to digital printing systems, and more particularly, to a method of improving print quality.

BACKGROUND OF THE INVENTION

Existing electrophotographic printer technologies make use of a photoconductive drum. Depending on the type of photoconductor used, the drum is either charged or discharged to attract toner, with the charging or discharging accomplished by reflecting light onto the drum. The drum then transfers the toner to the paper or other surface to be printed upon.

To expose the drum, a light modulator or other imaging device may be used. Typically, the imaging device has an array of pixels as wide as the printed image. These pixels are addressed with data, which indicates the exposure for each pixel. The drum rotates so that one line of the drum is exposed by a line of pixels during each line period.

To some extent, gray scaling can be done by varying the exposure at points on the drum to control the amount of toner on any point. One way to vary the exposure is to re-expose the same line of the drum by successive lines of pixels. As the drum rotates, overlapping exposures are accumulated on it. Each line is re-exposed for as many times as is desired for a given greyscale capability. This approach to providing greyscale is referred to as "dot density modulation".

The quality of text printed on electrophotographic printers is degraded by the fact that lines that are not exactly vertical or horizontal will show deviations from their true shape. More specifically, these lines will appear as "stair stepped." This artifact is sometimes referred to as "aliasing." In fonts, the effect of aliasing is proportional to the amount of curvature in a font. Examples of fonts that are especially susceptible are serifs and italics.

For binary printers, where the pixels are either colored or not colored (without greyscale), the traditional solution to reduce aliasing is to increase the resolution, such as from 300 dpi (dots per inch) to 400 or 600 dpi. Problems with this approach are the need for more refined electrophotographic processes and high system overhead in terms of memory and bandwidth.

With printers that are capable of greyscale printing, aliasing can be reduced with techniques using dot density modulation. For example, pixels on edges of a black colored object, and that have only a partial contribution to the object, can be colored gray so that the stair stepping is not as evident. The use of greyscale to reduce the effects of aliasing is described in Foley, et al., *Computer Graphics*, (Addison-Wesley Publishing Co., Inc. 2d ed. 1990) pp. 132–40.

SUMMARY OF THE INVENTION

One aspect of the invention is a method of reducing aliasing along an edge of an object to be printed as an image comprised of pixels. Each pixel on the edge, and therefore partly overlapped by the object, is divided into two or more phases. Exposing a pixel in several phases can be accomplished using pulse position modulation with a two-dimensional spatial light modulator, as described in U.S. Pat. No. 5,461,410 entitled "Grayscale Printing Using Spatial Light Modulators" and U.S. Pat. No. 5,461,411 entitled "Process and Architecture for Digital Micromirror Printer", both assigned to Texas Instruments Incorporated and incorporated by reference herein. Each phase or a combination of phases provides a different dot shape that can be printed for the pixel. For each pixel on the edge, one of the dot shapes is selected, each pixel's dot shape being selected by including any phase that is overlapped by the object by more than a predetermined amount. Then, a greyscale value is determined for each selected dot shape, such that the product of the greyscale value times the area of that dot shape is substantially the same as the ratio of overlap of that dot shape's corresponding pixel by the object. A variation of the method determines a greyscale value for each phase of each selected dot shape.

An advantage of the invention is that it provides an alternative to increased resolution as a solution to aliasing.

BRIEF DESCRIPTION OF THE DRAWINGS

FIG. 2 illustrates a portion of an object to be printed and its overlap with a pixel.

FIG. 3 illustrates the pixel of FIG. 2, printed by selected the best dot shape from a two-phase pixel in accordance with the invention.

FIG. 4 illustrates the object of FIG. 2, printed with overlapped phases from a two-phase pixel in accordance with the invention.

FIG. 5 illustrates a four-phase pixel and its eight different dot shapes.

DETAILED DESCRIPTION OF THE INVENTION

The invention described herein is in terms of use with an electrophotographic printer, specifically, one in which a photoconductive drum is exposed by light from a spatial light modulator. The invention is also useful with electrophotographic printers with other exposure devices. Furthermore, the printer need not be electrophotographic, and can be any printer that is capable of both dot density and dot area modulation. In general, the invention is directed to a method of combining density modulation and area modulation to reduce aliasing.

Figure 1:
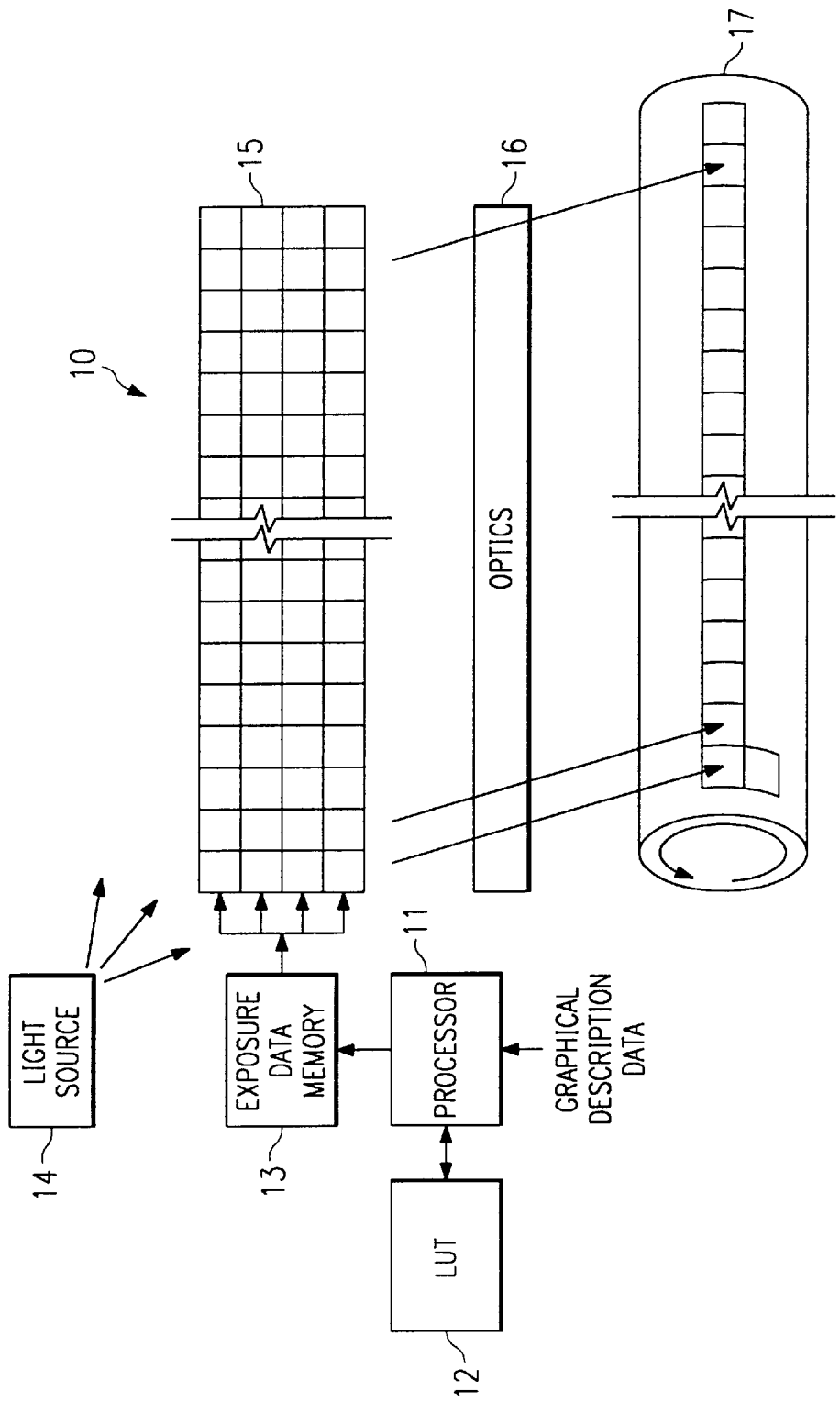
FIG. 1 illustrates a printer having a processor programmed in accordance with the invention.

FIG. 1 illustrates a printer 10 having a processor 11 programmed to implement the method of the invention. A drum 17 is exposed as an array of pixels. The exposure is accomplished with a spatial light modulator (SLM) 15 having an array of pixel-generating elements. In the case of a spatial light modulator that is a digital micro-mirror device (DMD), each pixel-generating element is a tiny micro-mechanical mirror that tilts "on" or "off" to form the image.

Processor 11 receives graphical description data for objects to be printed. As explained below, processor 11 uses this data to determine the overlap between the objects and the pixels to be printed. Processor 11 then uses this data to determine a dot shape and a greyscale value for each pixel. Processor 11 accesses one or more look-up tables (LUTs) 12 to convert the greyscale values to exposure values. These values may directly represent exposure levels, or some other process may be used to obtain exposure levels. The appropriate pixel-generating elements of SLM 15 are activated so as to achieve the desired dot shape and density for each pixel.

U.S. Pat. No. 5,461,410, referenced above, describe various methods for exposing a drum with a digital micro-mirror device. The exposure values are stored in an exposure data memory 13 in a format appropriate for delivery to the SLM 15. The SLM 15 is illuminated by a light source 14, and appropriate optics 16 are used to transfer the SLM image to the drum 17. Exposure by successive lines of SLM 15 permits variations in exposure level and pixel phase so that each pixel's density and dot shape can modulated.

FIG. 2 illustrates a portion of an object 11 to be printed and its overlap with a pixel 12. For purposes of illustration, each pixel is represented as a square, such that the image to be printed is printed as a tiled array of pixels. In this description, when an object is said to overlap all or part of a pixel, it is illustrated as overlapping all or part of the square area represented by the pixel. In FIG. 2, approximately 0.25 of object 11 overlaps pixel 12. This overlap is referred to herein as the object/pixel overlap and is expressed as a percent of a unit pixel area. For purposes of example, object 11 is printed black on a white background, but other colors could be used. In the case of color printing, greyscale values in accordance with the invention would result in colors of less intensity.

FIGS. 3 and 4 illustrate two methods of printing object 11 in accordance with the invention. As explained below, both dot area modulation and dot density modulation have been used to reduce aliasing.

In FIGS. 3 and 4, pixel 12 has two possible phases. A first phase, P1, is the upper half of pixel 12 and the second phase, P2, is the lower half of pixel 12. Each phase covers an area of 0.5 of pixel 12. This two-phase pixel 12 has three possible dot shapes: P1, P2, and P1+P2.

In FIG. 3, the "best" dot shape has been selected and printed. In general, the "best" dot shape is the one that most closely matches, geometrically, the fill of pixel 12 by object 11. The process of selecting the best dot shape is generally based on a mathematical calculations, but heuristic rules could also be applied. For example, any phase that is overlapped by more than a certain percent by object 11 could be included in the selected dot shape. For example, the threshold might be 25%. In FIG. 3, P2 is overlapped by more than 20% but P1 is not. Thus, P2 is selected as the "best" dot shape. P2 is printed and P1 is not printed. In other words, only P2's dot shape is used to print the portion of object 11 associated with pixel 12.

The next step is to select a greyscale value for the selected dot shape. For purposes of this description, all greyscale values are normalized to a proportion of a maximum intensity of 1, and thus range from 0 to 1. For printing the object of FIG. 2, the desired greyscale value is one that will provide an effective print value of 0.25, which is the object/pixel overlap expressed as a percent of a unit pixel area. Expressed mathematically:

$$\text{object/pixel overlap} = \text{dot area} \times \text{greyscale}$$

$$\text{greyscale} = \frac{\text{object/pixel overlap}}{\text{dot size}}$$

Here, $$\text{greyscale} = \frac{.5}{.25}$$
$$= .5$$

Thus, the P2 dot is printed with a greyscale of 0.5.

FIG. 4 illustrates a second method of printing object 11 with a two-phase pixel 12. In this method, any phase that object 11 overlaps is printed. Thus, both P1 and P2 are printed. Analogously to the method of FIG. 3, the greyscale values are calculated to determine an effective greyscale level for pixel 12 that is approximately the same as the object/pixel overlap of 0.25. To do this, the relative contribution of each phase to the object is a factor. Referring again to FIG. 2, about 98% of object 11 is in P2 and about 2% is in P1. These values are the phases' "distribution" values, expressed as percents of the total fill by object 11 of the corresponding pixel. Expressed mathematically, the greyscale value for each phase is calculated as:

$$\text{object/pixel overlap} * \text{distribution} = \text{dot area} \times \text{greyscale}$$

$$\text{greyscale} = \frac{\text{object/pixel overlap} * \text{distribution}}{\text{dot area}}$$

Here, for $P1$, $$\text{greyscale} = \frac{.25 * .02}{.5}$$
$$= .01$$

For $P2$, $$\text{greyscale} = \frac{.25 * .98}{.5}$$
$$= .49$$

Thus, in FIG. 4, P1 is printed with a greyscale value of 0.01 and P2 is printed with a greyscale value of 0.49, relative to a maximum intensity of 1. The effective greyscale value for the pixel 12 is the total of the two effective greyscale values, or 0.49(0.5)+0.01(0.5)=25%.

FIG. 5 illustrates a pixel 51, having four possible phases, P1, P2, P3, and P4. Printer 10 is implemented so as to print each pixel with one or two phases. Eight different dot shapes can be achieved with the four phases.

Figure 6:
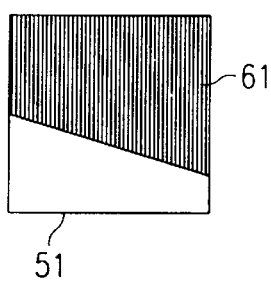
FIG. 6 illustrates a portion of an object to be printed and its overlap with the pixel of FIG. 5.

FIG. 6 illustrates an object 61 partially overlapping the four-phase pixel 51 of FIG. 5. The object/pixel overlap is about 65%. The same basic method as described above in connection with FIGS. 3 and 4 is used to print an object with a four-phase pixel. One or more phases are selected on the basis of their overlap by object 61. These phases may be the "best" dot shape in terms of matching the shape of the overlap or may be any overlapped phases. Then a greyscale level for each selected phase is calculated.

Figure 7:
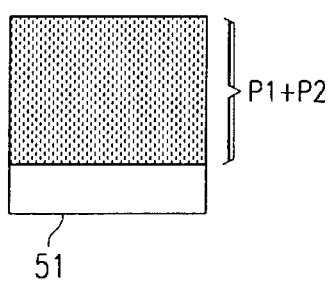
FIG. 7 illustrates the object of FIG. 6, printed with the best dot shape from the four-phase pixel of FIG. 5 in accordance with the invention.

In FIG. 7, the phases that comprise the best dot shape have been selected to print object 61 with pixel 51. To determine the best dot shape, any phase that is overlapped more than a certain amount is included in the selected dot shape. This is the method of FIG. 3. Using this criteria, the dot shape formed by P1+P2 has the best match with the object/pixel overlap. Once the dot shape for each pixel is determined, the next step is to determine a greyscale value for each phase of the pixel. This is done is the same manner as described above in connection with FIG. 3, to obtain an effective greyscale value of approximately 0.65 to match the object/pixel overlap.

Figure 8:
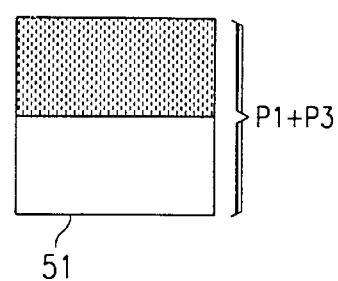
FIG. 8 illustrates the object of FIG. 6, printed with overlapped phases from the four-phase pixel of FIG. 5 in accordance with the invention.

In FIG. 8, the phases to be printed are selected by determining whether there is any overlap of a phase by object 61. This is the method of FIG. 4. Here, object 61 overlaps all phases. P1+P3 is the largest dot shape that includes all phases, thus phases P1 and P3 will be printed. As discussed above, the phases may be given different greyscale values according to their contribution to the object 61. In general, because P1 contributes more to object 61 than does P3, it will have a darker greyscale.

For all of the described variations of the invention, once a greyscale value is calculated, it may be further processed to obtain a final exposure value. Referring again to FIG. 1, printer system 10 has at least one look-up table (LUT) 12. If desired, the calculated greyscale values can be mapped through a LUT 12. An example of the use of such mapping is to accuont for non-linearities of the system 10.

Figure 9:
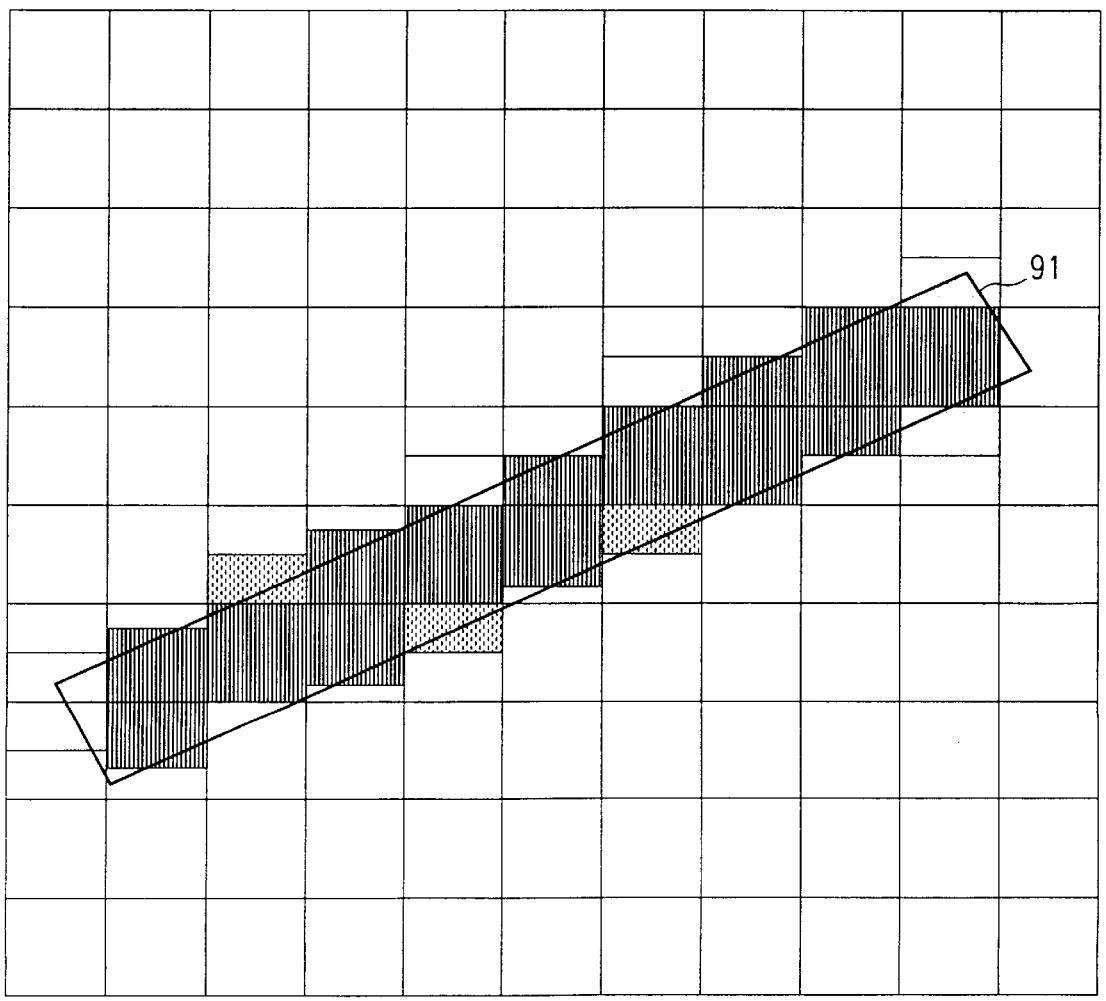
FIG. 9 illustrates a diagonal line printed with the four-phase pixel of FIG. 5.

FIG. 9 illustrates an object 91 and its printed representation, printed in accordance with the invention, with four-phase pixels like the pixel 51 of FIG. 5. Object 91 is a diagonal line as indicated by the outline. Because of the dimensions of the object 91, no pixel is completely overlapped by object 91. Each pixel is printed with a dot shape and a greyscale, which are determined as a function of the overlap of object 91 with that pixel. As described above, the object's overlap is compared with the phases to select a dot shape and its overlap is further used to determine the greyscale with which the selected dot shape will be printed. The perceived effect is a smoothing of "jaggies" along the edges of object 91.

The concept of combining dot shape manipulation with greyscale selection for anti-aliasing can be extended to the use of anti-aliasing filters. Filters for anti-aliasing are described in Foley, et al., *Computer Graphics*, (Addison-Wesley Publishing Co., Inc. 2d ed. 1990) pp. 132–40, 628–36. Common anti-aliasing filters are box and cone filters. In accordance with the invention, the filter domain would be comprised of phases of pixels rather than pixels. As described above, the phases to be printed would be selected on the basis of how much the object overlaps the phase. Greyscale values would be calculated from the algorithm on a phase basis rather than a pixel basis. In general, the greyscale value of a phase will decrease with its amount of overlap by the object.

Other Embodiments

Although the present invention and its advantages have been described in detail, it should be understood that various changes, substitutions and alterations can be made herein without departing from the spirit and scope of the invention as defined by the appended claims.

What is claimed is:

1. A method of reducing aliasing for printing an object as an image comprised of pixels, comprising the steps of:

dividing each pixel to be printed into two or more phases, said phases or combinations of said phases providing different dot shapes to be printed for said pixels;

selecting one of said dot shapes for said each pixel to be printed, each pixel's dot shape being selected by including any of said phases that is overlapped by said object by more than a predetermined amount; and determining a greyscale value for each said dot shape, such that the product of said greyscale value times the area of said dot shape is substantially the same as the percent of overlap of that dot shape's corresponding pixel by said object.

2. The method of claim 1, wherein said phases are the same size but occupy different locations within a pixel.

3. The method of claim 1, wherein said phases occupy overlapping locations within a pixel.

4. The method of claim 1, wherein said predetermined amount is any amount greater than 0%.

5. The method of claim 1, further comprising the step of mapping said greyscale value through a look-up table.

6. The method of claim 1, wherein each said phase is associated with a filter domain and where said step of determining a greyscale value is performed in accordance with an anti-aliasing filter algorithm.

7. A method of reducing aliasing for printing an object as an image comprised of pixels, comprising the steps of:

dividing each pixel to be printed into two or more phases;

selecting one or more of said phases for said each pixel to be printed, by including any of said phases that is overlapped by said object by more than a predetermined amount; and determining a greyscale value for each said phase, such that the product of said greyscale value times the area of said phase is substantially the same as the percent of overlap of that phase's corresponding pixel by said object times the percent of distribution of said object within said pixel.

8. The method of claim 7, wherein said phases are the same size but occupy different locations within a pixel.

9. The method of claim 7, wherein said phases occupy overlapping locations within a pixel.

10. The method of claim 7, wherein said predetermined amount is any amount greater than 0%.

11. The method of claim 7, further comprising the step of mapping said greyscale values through a look-up table that compensates non-linearities of a printer.

12. The method of claim 7, wherein each said pixel to be printed is associated with a filter domain and where said step of determining a greyscale value is performed in accordance with an anti-aliasing filter altorithm.

13. A method of reducing aliasing for printing an object as an image comprised of pixels, using an anti-aliasing filter having a filter domain that includes a given number of pixels, comprising the steps of:

assigning said given number of pixels to be printed to said filter domain;

dividing said each pixel to be printed into two or more phases, said phases or combinations of said phases providing different dot shapes to be printed for said pixels;

selecting one of said dot shapes for said each pixel to be printed, each pixel's dot shape being selected by including any of said phases that is overlapped by said object by more than a predetermined amount;

determining a greyscale value for each said dot shape in accordance with said anti-aliasing filter; and repeating each of said steps for all of said pixels to be printed.

* * * * *